United States Patent
Salter et al.

(10) Patent No.: US 9,527,438 B2
(45) Date of Patent: Dec. 27, 2016

(54) PHOTOLUMINESCENT BLIND SPOT WARNING INDICATOR

(71) Applicant: Ford Global Technologies, LLC, Dearborn, MI (US)

(72) Inventors: Stuart C. Salter, White Lake, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 334 days.

(21) Appl. No.: 14/322,506

(22) Filed: Jul. 2, 2014

(65) Prior Publication Data

US 2015/0138797 A1 May 21, 2015

Related U.S. Application Data (63) Continuation-in-part of application No. 14/301,635, filed on Jun. 11, 2014, which is a continuation-in-part of application No. 14/156,869, filed on Jan. 16, 2014, which is a continuation-in-part of application No. 14/086,442, filed on Nov. 21, 2013.

(51) Int. Cl.
*F21V 11/00* (2015.01)
*B60Q 3/02* (2006.01)
*B60Q 3/00* (2006.01)
*B60Q 3/04* (2006.01)
*B60Q 9/00* (2006.01)

(52) U.S. Cl.
CPC ............ *B60Q 3/0293* (2013.01); *B60Q 3/008* (2013.01); *B60Q 3/042* (2013.01); *B60Q 9/00* (2013.01)

(58) Field of Classification Search
CPC ..... B60Q 3/008; B60Q 3/0293; B60Q 3/0296; B60Q 3/042; B60Q 9/00
USPC .................................. 362/488, 490, 510–511
See application file for complete search history.

(56) References Cited

U.S. PATENT DOCUMENTS

| | | |
|---|---|---|
| 5,709,453 A | 1/1998 | Krent et al. |
| 6,117,362 A | 9/2000 | Yen et al. |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,914,521 B2 | 7/2005 | Rothkop |
| 6,953,536 B2 | 10/2005 | Yen et al. |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Jason Moon Han
(74) *Attorney, Agent, or Firm* — Vichit Chea; Price Heneveld LLP (57) ABSTRACT

A vehicle indicator apparatus is disclosed. The apparatus comprises a photoluminescent portion disposed on a forward vehicle pillar and a light source located proximate the forward vehicle pillar. The light source is configured to emit light at a first wavelength directed toward the photoluminescent portion. The photoluminescent portion is configured to convert the first wavelength to at least a second wavelength longer than the first wavelength to illuminate a surface of the forward vehicle pillar.

20 Claims, 5 Drawing Sheets

(56) References Cited

U.S. PATENT DOCUMENTS

| | | |
|---|---|---|
| 6,985,073 B1 | 1/2006 | Doan |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,773,012 B2 | 7/2014 | Ryu et al. |
| 8,846,184 B2 | 9/2014 | Agrawal et al. |
| 8,952,341 B2 | 2/2015 | Kingsley et al. |
| 9,057,021 B2 | 6/2015 | Kingsley et al. |
| 9,065,447 B2 | 6/2015 | Buttolo et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0200428 A1 | 8/2012 | Lynam et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 05229385 A | 9/1993 |
| JP | 2000159011 A | 6/2000 |
| JP | 2007238063 A | 9/2007 |
| WO | 2006047306 A1 | 5/2006 |
| WO | 2014068440 A1 | 5/2014 |

PHOTOLUMINESCENT BLIND SPOT WARNING INDICATOR

CROSS-REFERENCE TO RELATED APPLICATIONS

This application is a continuation-in-part of U.S. patent application Ser. No. 14/301,635, filed Jun. 11, 2014, and entitled "PHOTOLUMINESCENT VEHICLE READING LAMP," which is a continuation-in-part of U.S. patent application Ser. No. 14/156,869, filed on Jan. 16, 2014, entitled "VEHICLE DOME LIGHTING SYSTEM WITH PHOTOLUMINESCENT STRUCTURE," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to vehicle lighting systems, and more particularly, to a vehicle indicator employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, a vehicle indicator apparatus is disclosed. The apparatus comprises a photoluminescent portion disposed on a forward vehicle pillar and a light source located proximate the forward vehicle pillar. The light source is configured to emit light at a first wavelength directed toward the photoluminescent portion. The photoluminescent portion is configured to convert the first wavelength to at least a second wavelength longer than the first wavelength to illuminate a surface of the forward vehicle pillar.

According to another aspect of the present invention, a vehicle notification system is disclosed comprising at least one photoluminescent portion located on a forward vehicle pillar. The system further comprises at least one light source in communication with a light controller and a vehicle warning system. The light source is configured to emit light at a first wavelength toward the photoluminescent portion to illuminate the photoluminescent portion in at least a second wavelength in response to a signal received from the vehicle warning system.

According to yet another aspect of the present invention, a vehicle notification system is disclosed comprising a photoluminescent portion disposed proximate an A-pillar. A light source is located proximate the A-pillar and configured to emit light at a first wavelength directed toward the photoluminescent portion. The photoluminescent portion is configured to convert the first wavelength to at least a second wavelength, longer than the first wavelength, to illuminate a surface of the forward vehicle pillar.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a vehicle indicator configured to illuminate a photoluminescent portion of a forward vehicle pillar in response to a vehicle warning condition. The vehicle warning condition may be in response to a blind spot detection system identifying a target vehicle in a blind spot. The vehicle indicator comprises a light source located proximate the forward vehicle pillar configured to emit light corresponding to a first emission at a first wavelength directed toward the photoluminescent portion. The photoluminescent portion is configured to convert the first wavelength of the first emission to at least a second emission having a second wavelength longer than the first wavelength. The second emission is configured to illuminate a surface of the forward vehicle pillar to notify an operator of the vehicle of the target vehicle located in a blind spot.

Figure 1:
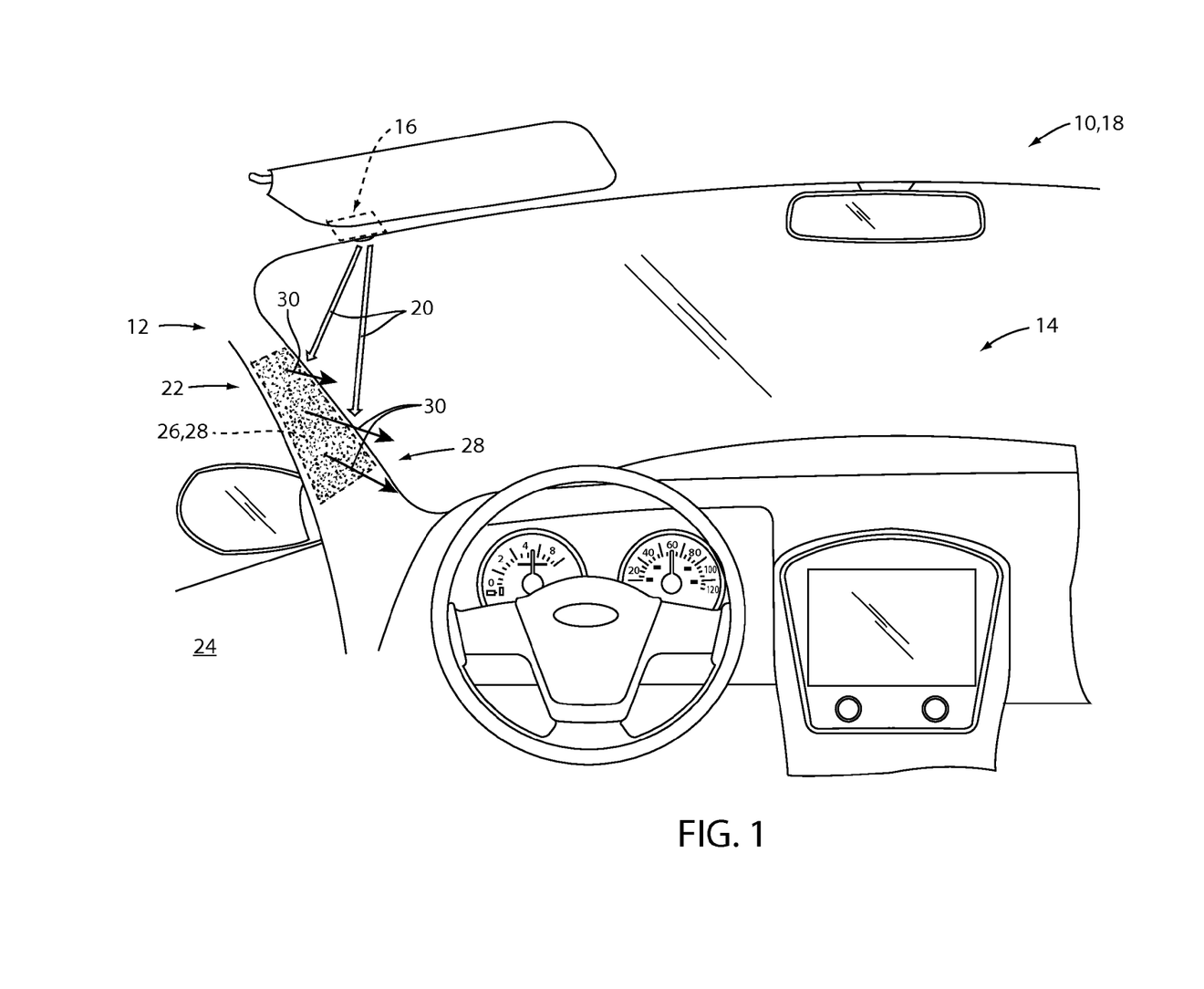
FIG. 1 is a perspective view of a passenger compartment of a vehicle comprising a indicator apparatus.

Referring to FIG. 1, a perspective view of a vehicle 10 is shown demonstrating an indicator apparatus 12 or notification apparatus for a vehicle passenger compartment 14. The indicator apparatus 12 comprises a light source 16 in communication with a blind spot monitoring system of the vehicle 10. The vehicle 10, comprising the indicator apparatus 12, may be referred to as the equipped vehicle 18. In response to a detection of a target vehicle located in a blind spot of the equipped vehicle 18, a blind spot monitoring system may communicate a signal to the light source 16 causing the light source 16 to emit a first emission 20 having a first wavelength $\lambda_1$. The light source 16 may be configured to direct the first emission 20 toward a forward vehicle pillar, for example an A-pillar 22 proximate a passenger door 24.

The A-pillar 22 may comprise a photoluminescent portion 26 corresponding to a warning indicator 28. The photoluminescent portion 26 may be configured to have an absorption band corresponding to the first wavelength $\lambda_1$ of the first emission 20. In response to receiving electromagnetic energy at the first wavelength $\lambda_1$, the photoluminescent portion 26 may become excited and generate a second emission 30. The second emission 30 may cause the photoluminescent portion 26 to illuminate in a color of light visible to an operator of the vehicle 10. For example, the second emission 30 may comprise at least a second wavelength $\lambda_2$ of light corresponding to a longer wavelength than the first wavelength $\lambda_1$. The first wavelength $\lambda_1$ may correspond to a blue or near UV wavelength of light that is substantially less perceptible by the human eye than the second wavelength $\lambda_2$ of light. In this configuration, the photoluminescent portion 26 may appear to illuminate without an operator of the vehicle 10 noticing first emission 20.

For example, the light source 16 may be selectively activated to emit the first emission 20. The first emission 20 at the first wavelength $\lambda_1$ may pass through a volumetric space within the passenger compartment 14 such that the first emission 20 is nearly imperceptible to an operator of the vehicle 10. In response to receiving the first emission 20, the photoluminescent portion 26 may output the second emission 30 at the second wavelength $\lambda_2$ which may correspond to a wavelength of light that is acutely perceptible in the visible color. As such, the light source 16 may be configured to provide a remote activation source to activate the second emission 30 from the photoluminescent portion 26. In this way, the operator of the vehicle 10 may be notified of a detection of a target vehicle by illuminating the photoluminescent portion 26 of the warning indicator 30 without requiring an electrical connection to the A-pillar 22.

In some implementations, systems and methods discussed herein provide for the indicator apparatus 12 configured to selectively illuminate the photoluminescent portion 26 by activating the light source 16 in a remote location relative to the photoluminescent portion 26. The indicator apparatus 12 may provide for an advantageous configuration to illuminate a portion of the A-pillar 22 to notify an operator of the vehicle 10 of a detection of a target vehicle or any other vehicle warning condition. The various configurations of the indicator apparatus 12 and similar systems described herein provide for the warning indicator 30 to be incorporated in A-pillar 22 having various dimensions, colors, and designs configured to provide obvious notifications to the operator of the vehicle 10. The indicator apparatus 12 may be particularly advantageous in modern automobiles having limited space for a warning indicator located on a forward vehicle pillar.

The A-pillar 22 may correspond to a portion of the vehicle 10 configured to connect and structurally support a roof of the vehicle 10 to a body of the vehicle. In particular, the A-pillar may extend along the windshield from the body to the roof of the vehicle 10. A forward vehicle pillar may correspond to the A-pillar or any other pillar located in an aft portion of the vehicle such that it may be visible to an operator of the vehicle 10. Though a forward vehicle pillar is discussed to at least one exemplary implementation, other portions of the vehicle 10 may be similarly configured to incorporate the warning indicator 30.

The blind spot monitoring system as discussed herein may refer to a variety of driver assist, detection, and warning systems that may utilize at least one warning indicator. In response to a signal identifying a vehicle warning condition, a lighting controller of the vehicle 10 may be configured to selectively activate the light source 16 causing the light source 16 to emit the first emission 20 as a solid or temporally periodic output emission. A variety of methods and systems may be utilized for the blind spot monitoring system which may be configured to detect a vehicle warning condition, as discussed herein. A vehicle warning condition may comprise the detection of a target vehicle in a blind spot of an equipped vehicle or any other form of notification communicated to a vehicle operator for example a turn signal notification, collision warning, etc. Examples of blind spot warning systems and vehicle notifications operable to detect a vehicle warning condition may be found in U.S. Pat. No. 6,737,964 to Samman et al., entitled "VEHICLE BLIND SPOT MONITORING SYSTEM," filed May 18, 2004; U.S. Pat. No. 6,859,148 to Miller et al., entitled "BLIND SPOT WARNING SYSTEM FOR AN AUTOMOTIVE VEHICLE," filed Feb. 22, 2005; U.S. Pat. No. 7,161,472 to Strumolo et al., entitled "BLIND-SPOT WARNING SYSTEM FOR AN AUTOMOTIVE VEHICLE," filed Jan. 9, 2007; U.S. Pat. No. 8,022,818 to la Tendresse et al., entitled "WARNING APPARATUS FOR A MOTOR VEHICLE," filed Sep. 20, 2011; and U.S. Pat. No. 8,552,848 to Rao et al., entitled "SYSTEM AND METHOD FOR COMBINED BLIND SPOT DETECTION AND REAR CROSSING PATH COLLISION WARNING," filed Oct. 8, 2013, which are incorporated herein by reference in their entirety.

Figure 2A:
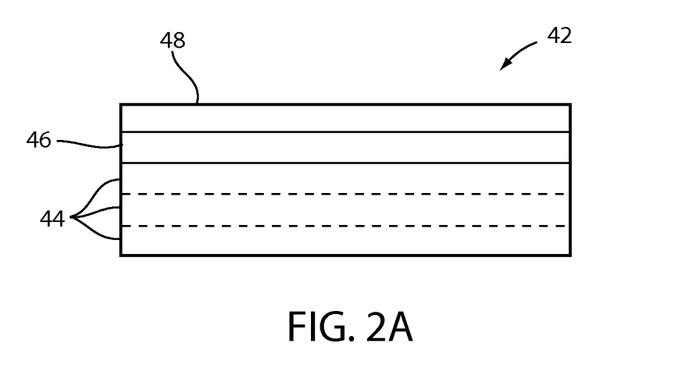
FIG. 2A illustrates a photoluminescent structure rendered as a coating.
Figure 2B:
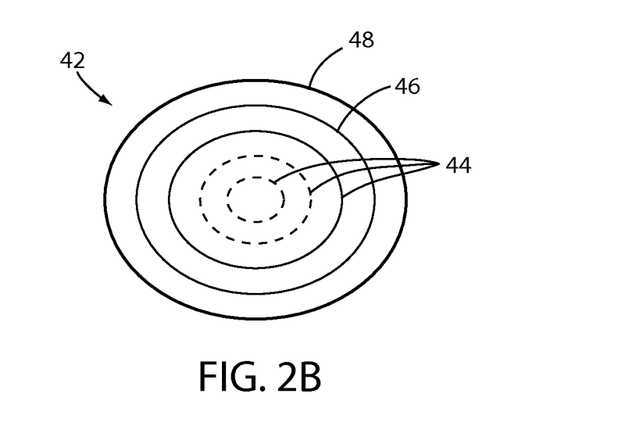
FIG. 2B illustrates the photoluminescent structure rendered as a discrete particle.
Figure 2C:
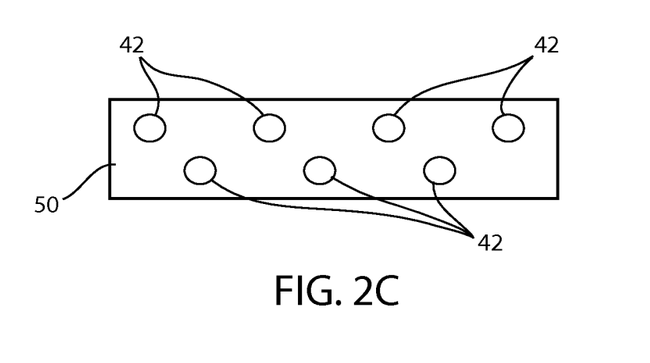
FIG. 2C illustrates a plurality of photoluminescent structures rendered as discrete particles and incorporated into a separate structure.

The indicator apparatus 12 may utilize at least one photoluminescent material to provide for the illumination of the warning indicator 30. Referring to FIGS. 2A-2C, a photoluminescent structure 42 is generally shown rendered as a coating (e.g. a film) capable of being applied to a vehicle fixture, a discrete particle capable of being implanted in a vehicle fixture, and a plurality of discrete particles incorporated into a separate structure capable of being applied to a vehicle fixture, respectively. The photoluminescent structure 42 may correspond to a photoluminescent portion as discussed herein, for example the photoluminescent portion 26. At the most basic level, the photoluminescent structure 42 includes an energy conversion layer 44 that may be provided as a single layer or a multilayer structure, as shown through broken lines in FIGS. 2A and 2B.

The energy conversion layer 44 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various implementations discussed herein, each of the wavelengths of light (e.g. the first wavelength, etc.) correspond to electromagnetic radiation utilized in the conversion process.

Each of the photoluminescent portions may comprise at least one photoluminescent structure 42 comprising an energy conversion layer (e.g. conversion layer 44). The energy conversion layer 44 may be prepared by dispersing the photoluminescent material in a polymer matrix 50 to form a homogenous mixture using a variety of methods. Such methods may include preparing the energy conversion layer 44 from a formulation in a liquid carrier medium and coating the energy conversion layer 44 to a desired planar and/or non-planar substrate of a vehicle fixture. The energy conversion layer 44 coating may be deposited on a vehicle fixture (e.g. the A-pillar 22) by painting, screen printing, spraying, slot coating, dip coating, roller coating, and bar coating. Additionally, the energy conversion layer 44 may be prepared by methods that do not use a liquid carrier medium.

For example, a solid state solution (homogenous mixture in a dry state) of one or more photoluminescent materials may be incorporated in a polymer matrix 50 to provide the energy conversion layer 44. The polymer matrix 50 may be formed by extrusion, injection molding, compression molding, calendaring, thermoforming, etc. In instances where one or more energy conversion layers 44 are rendered as particles, the single or multi-layered energy conversion layers 44 may be implanted into a vehicle fixture or panel. When the energy conversion layer 44 includes a multilayer formulation, each layer may be sequentially coated. Additionally, the layers can be separately prepared and later laminated or embossed together to form an integral layer. The layers may also be coextruded to prepare an integrated multi-layered energy conversion structure.

Referring back to FIGS. 2A and 2B, the photoluminescent structure 42 may optionally include at least one stability layer 46 to protect the photoluminescent material contained within the energy conversion layer 44 from photolytic and thermal degradation. The stability layer 46 may be configured as a separate layer optically coupled and adhered to the energy conversion layer 44. The stability layer 46 may also be integrated with the energy conversion layer 44. The photoluminescent structure 42 may also optionally include a protective layer 48 optically coupled and adhered to the stability layer 46 or any layer or coating to protect the photoluminescent structure 42 from physical and chemical damage arising from environmental exposure.

The stability layer 46 and/or the protective layer 48 may be combined with the energy conversion layer 44 to form an integrated photoluminescent structure 42 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 42. Once formed, the photoluminescent structure 42 may be applied to a chosen vehicle fixture.

In some implementations, the photoluminescent structure 42 may be incorporated into a vehicle fixture as one or more discrete multilayered particles as shown in FIG. 2C. The photoluminescent structure 42 may also be provided as one or more discrete multilayered particles dispersed in a polymer formulation that is subsequently applied to a vehicle fixture or panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Figure 3:
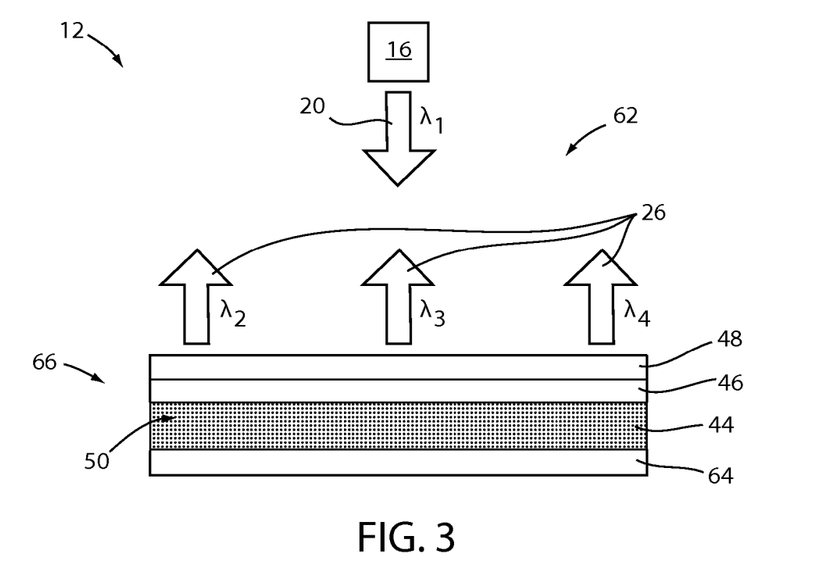
FIG. 3 is schematic view of front-lit configuration of an indicator apparatus configured to convert a first wavelength of light to at least a second wavelength.

Referring to FIG. 3, the indicator apparatus 12 is generally shown according to a front-lit configuration 62 to convert the first emission 20 from the light source 16 to the second emission 30. The first emission 20 comprises a first wavelength $\lambda_1$, and the second emission 30 comprises a second wavelength $\lambda_2$. The indicator apparatus 12 includes the photoluminescent structure 42 rendered as a coating and applied to a substrate 64 of a vehicle fixture 66. The photoluminescent structure 42 includes the energy conversion layer 44, and in some implementations may include the stability layer 46 and/or protective layer 48. In response to the light source 16 being activated, the first emission 20 is converted from the first wavelength $\lambda_1$ to the second emission 30 having at least the second wavelength $\lambda_2$. The second emission 30 may comprise a plurality of wavelengths $\lambda_2$, $\lambda_3$, $\lambda_4$ configured to emit any color of light from the photoluminescent portion 26.

In various implementations, the indicator apparatus 12 comprises at least one energy conversion layer configured to convert the first emission 20 at the first wavelength $\lambda_1$ to the second emission 30 having at least the second wavelength $\lambda_2$. In order to generate the plurality of wavelengths $\lambda_2$, $\lambda_3$, $\lambda_4$, the energy conversion layer 44 may comprise a red-emitting photoluminescent material, a green-emitting photoluminescent material, and a blue-emitting photoluminescent material dispersed in the polymer matrix 50. The red, green, and blue-emitting photoluminescent materials may be combined to generate a wide variety of colors of light for the second emission 30. For example, the red, green, and blue-emitting photoluminescent materials may be utilized in a variety of proportions and combinations to control the output color of the second emission 30.

Each of the photoluminescent materials may vary in output intensity, output wavelength, and peak absorption wavelengths based on a particular photochemical structure and combinations of photochemical structures utilized in the energy conversion layer 44. As an example, the second emission 30 may be changed by adjusting the wavelength of the first emission $\lambda_1$ to activate the photoluminescent materials at different intensities to alter the color of the second emission 30. In addition to or alternatively to the red, green, and blue-emitting photoluminescent materials, other photoluminescent materials may be utilized alone or in various combinations to generate the second emission 30 in a wide variety of colors. In this way, the indicator apparatus 12 may be configured for a variety of applications to provide a desired lighting color and effect for the vehicle 10.

The light source 16 may also be referred to as an excitation source and is operable to emit at least the first emission 20. The light source 16 may comprise any form of light source, for example halogen lighting, fluorescent lighting, light emitting diodes (LEDs), organic LEDs (OLEDs), polymer LEDs (PLEDs), solid state lighting or any other form of lighting configured to output the first emission 20. The first emission 20 from the light source 16 may be configured such that the first wavelength $\lambda_1$ corresponds to at least one absorption wavelength of the one or more photoluminescent materials of the energy conversion layer 44. In response to receiving the light at the first wavelength $\lambda_1$, the energy conversion layer 44 may be excited and output the one or more output wavelengths $\lambda_2$, $\lambda_3$, $\lambda_4$. The first emission 20 may provide an excitation source for the energy conversion layer 44 by targeting absorption wavelengths of the various photoluminescent materials utilized therein. As such, the indicator apparatus 12 may configured to output the second emission 30 to generate a desired light intensity and color in response to receiving the first emission 20.

In an exemplary implementation, the light source 16 comprises an LED configured to emit the first wavelength $\lambda_1$ which corresponds to a blue spectral color range. The blue spectral color range comprises a range of wavelengths generally expressed as blue light (~440-500 nm). In some implementations, the first wavelength $\lambda_1$ may also comprise wavelengths in a near ultraviolet color range (~390-450 nm). In an exemplary implementation, first wavelength $\lambda_1$ may be approximately equal to 470 nm. In some implementations, the first wavelength $\lambda_1$ may be approximately less than 500 nm such that the first wavelength of the light is not significantly visible.

The blue spectral color range and shorter wavelengths may be utilized as an excitation source for the indicator apparatus 12 due to these wavelengths having limited perceptual acuity in the visible spectrum of the human eye. By utilizing shorter wavelengths for the first wavelength $\lambda_1$, and converting the first wavelength with the conversion layer 44 to at least one longer wavelength, the indicator apparatus 12 creates a visual effect of light originating from the photoluminescent structure 42. In this configuration, light is emitted from the photoluminescent structure 42 (e.g. the first photoluminescent portion 26) from locations of the vehicle 10 that may be inaccessible or costly to add conventional light sources requiring electrical connections.

As discussed herein, each of the plurality of wavelengths $\lambda_2$, $\lambda_3$, $\lambda_4$ may correspond to a significantly different spectral color range. The second wavelength $\lambda_2$ may correspond to the excitation of a red-emitting photoluminescent material having a wavelength of approximately 620-750 nm. The third wavelength $\lambda_3$ may correspond to the excitation of a green emitting photoluminescent material having a wavelength of approximately 526-606 nm. The fourth wavelength $\lambda_4$ may correspond to a blue or blue green emitting photo luminescent material having a wavelength longer than the first wavelength $\lambda_1$ and approximately 430-525 nm. The wavelengths $\lambda_2$, $\lambda_3$, $\lambda_4$ may be utilized to generate a wide variety of colors of light from the photoluminescent portion 26 from the first wavelength $\lambda_1$.

Figure 4:
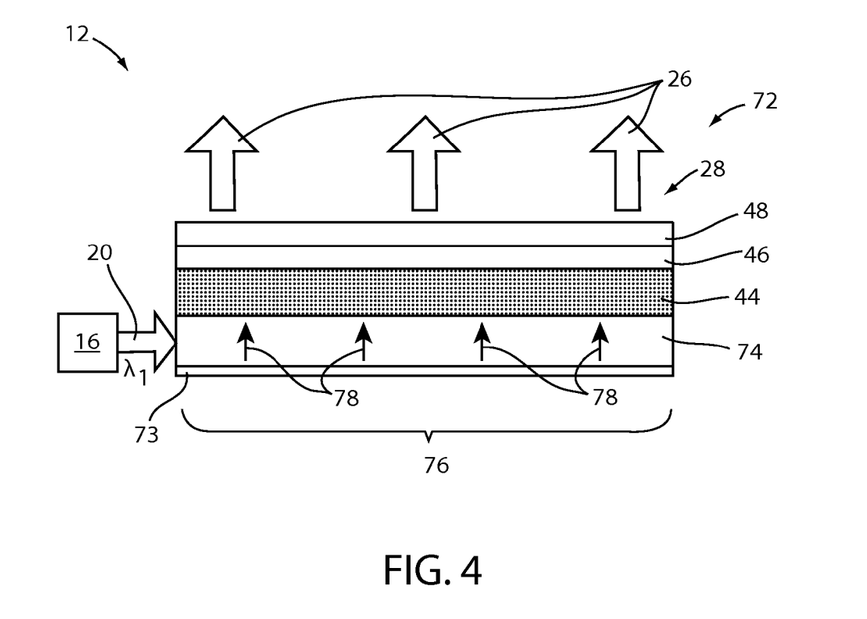
FIG. 4 is schematic view of back-lit configuration of an indicator apparatus configured to convert a first wavelength of light to at least a second wavelength.

Referring to FIG. 4, the indicator apparatus 12 is generally shown according to a back-lit configuration 72 to convert the first emission 20 from the light source 16 to the second emission 30. In this configuration, the indicator apparatus may comprise a light guide 74 configured to disperse and channel the light at the first wavelength $\lambda_1$ substantially along a length 76 of the photoluminescent portion 26. The light guide 74 may be of any material configured to transmit the light at the first wavelength $\lambda_1$ along the length 76. In some implementations, the light guide 74 may comprise a polymeric material configured to provide a refractive index such that the light at the first wavelength is transmitted consistently along the length 76. As demonstrated by arrows 78, the light at the first wavelength $\lambda_1$ may be directed outward from the photoluminescent portion 26 to the energy conversion layer 44.

A back-lit configuration 72 of the indicator apparatus 12 may be disposed on a surface 73 or substrate of the A-pillar 22 to provide a visual warning in the field of view of an operator of the vehicle corresponding to a vehicle warning condition. In response to the vehicle warning condition, the light source 16 may be activated such that the first wavelength $\lambda_1$ of the light is transmitted along the length 76 of the photoluminescent portion 26. The light at the first wavelength $\lambda_1$ is further output from the light guide 74 along the arrows 78 to excite the energy conversion layer 44. In response to the excitation, the energy conversion layer 44 is configured to output the second emission 30. Similar to the front-lit configuration 62, the energy conversion layer may be configured to output the second emission 30 at one or more wavelengths (e.g. $\lambda_2$, $\lambda_3$, $\lambda_4$) to illuminate the photoluminescent portion 26 in a variety of colors.

In some implementations, the surface 73 may comprise a reflective coating 80 configured to direct the light at the first wavelength $\lambda_1$ outward from the light guide 74 into the energy conversion layer 44. Additionally, the photoluminescent portion 26 may comprise the stability layer 46 and/or protective layer 48. As discussed herein, the various implementations of the indicator apparatus 12 are operable to illuminate the photoluminescent portion 26 by selectively activating the light source 16 in response to a vehicle warning condition. Some examples of vehicle warning conditions may include a blind spot detection, collision detection, drowsiness detection, object proximity notification, etc.

Figure 5:
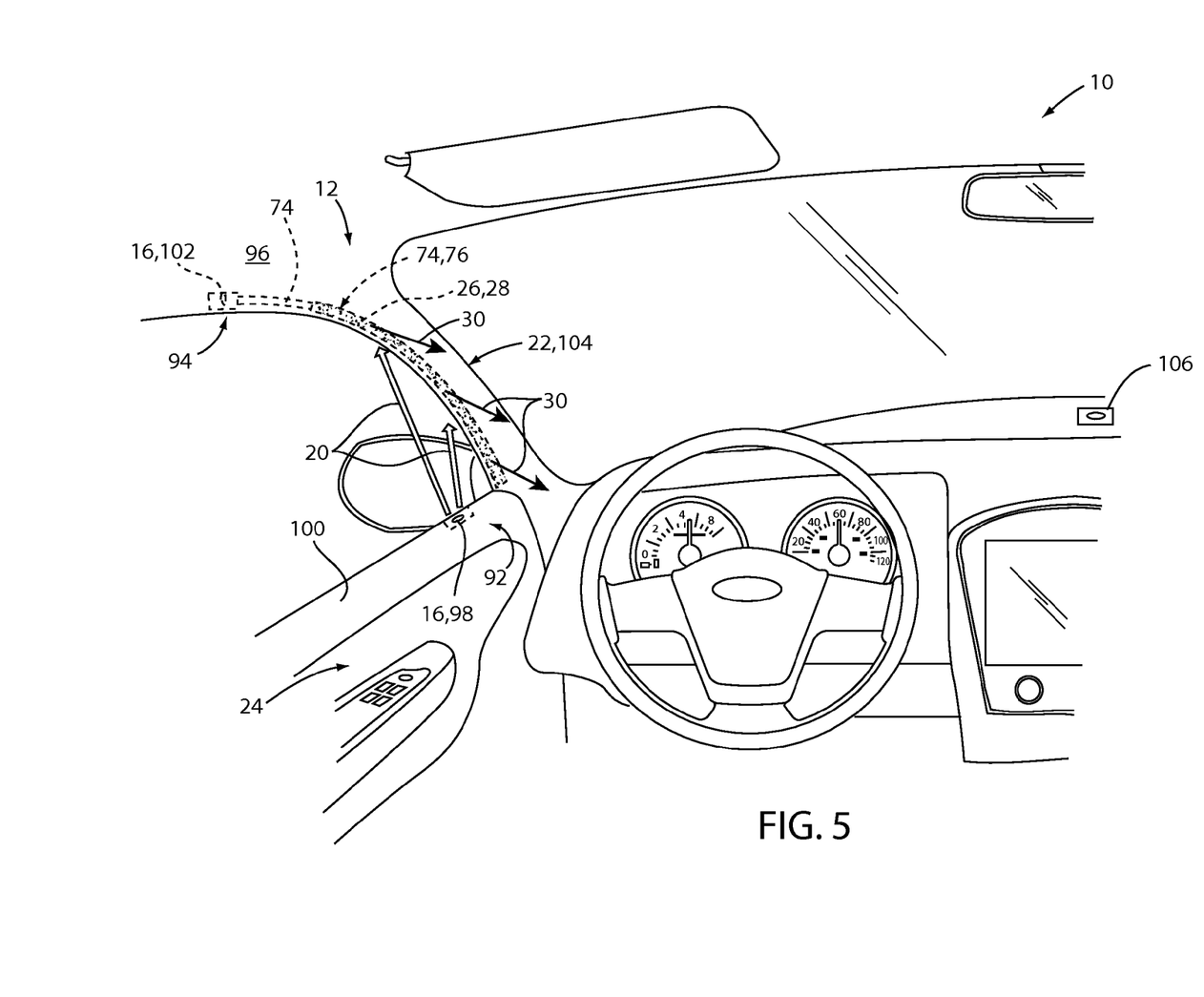
FIG. 5 is a perspective view of a passenger compartment of a vehicle comprising a indicator apparatus.

Referring to FIG. 5, a perspective view of the vehicle 10 is shown demonstrating additional implementations of the indicator apparatus 12 for the vehicle passenger compartment 14. A front-lit configuration 92 of the indicator apparatus 12, similar to that described in reference to FIGS. 1 and 3, is shown demonstrating the light source disposed in the passenger door 24 of the vehicle 10. Additionally, a back-lit configuration 94 of the indicator apparatus 12 is shown having the light source 16 disposed in a roof portion 96 of the vehicle 10. Though the light source 16 is demonstrated in particular locations in the passenger compartment 14, it shall be understood that the specific location may be altered based on a particular implementation. As demonstrated in the exemplary implementations of this disclosure, the indicator apparatus 12 may provide for illumination of the photoluminescent portion 26 by transmitting light at the first wavelength $\lambda_1$ through a portion of the passenger compartment 14.

The front-lit configuration 92 may comprise a submarine light 98 recessed in an interior door panel 100 such that the first emission 20 is directed upward toward the A-pillar 22. In this configuration, the first emission 20 is configured to pass through the passenger compartment 14 while the origin of the first emission 20 is significantly hidden from a line of sight of an operator of the vehicle 10. For example, the origin of the first emission corresponding to the submarine light 98 may be recessed such that the submarine light 98 is only visible from a position forward and upward relative to the submarine light 98. In this configuration, the first emission 20 may pass through a portion of the passenger compartment 14 to the photoluminescent portion 26 to activate the second emission 30 and illuminate the warning indicator 28 without being substantially perceptible to an operator of the vehicle 10.

The back-lit configuration 94 may comprise a hidden light source 102 disposed behind a headliner of the roof portion 96. As discussed in reference to FIG. 4, in the backlit configuration 94, the light at the first wavelength $\lambda_1$ may be transmitted through the light guide 74 along the length 76 of the photoluminescent portion 26. In this configuration, the hidden light source 102 may be selectively activated in response to a vehicle warning condition and emit the first emission 20 at the first wavelength $\lambda_1$ to illuminate the warning indicator 28. The light guide 74 may comprise a thin polymeric layer disposed along a surface 104 of the A-pillar 22. The light guide 74 may be configured to transmit the light significantly along the length 76 of the photoluminescent portion 26 to substantially illuminate the warning indicator 28. In this way, the back-lit configuration 94 provides similar benefits to the front lit configuration 92 by illuminating a substantial portion of the A-pillar 22 without requiring a light source disposed in the A-pillar 22.

In some implementations, the photoluminescent portion 26 may be disposed in in one of a window ledge, a door frame, and a headliner of the vehicle 10. The photoluminescent portion may also be disposed along a seal portion of a front window trim extending along the A-pillar 22. The photoluminescent portion 26 may extend from a significantly forward bottom portion of the window trim upward and may be significantly co-extensive with an upper extent of the windshield to maximize a notification to the operator. In various implementations, the photoluminescent portion 26 may be located such that a vehicle operator may be alerted to a warning condition.

Each of the implementations of the indicator apparatus 12 discussed herein may further comprise an ambient light sensor 106 in communication with the lighting controller of the vehicle 10. The lighting controller of the vehicle 10 may be configured to receive a signal from the ambient light sensor 106 to control an apparent intensity of the light source 16. In response to the signal from the ambient light sensor 106, the lighting controller may be configured to dim the light source 16 during low light or night conditions and increase a brightness or intensity of the light source 16 during bright or daylight conditions. The light source as referred herein may comprise the submarine light 98, the hidden light source 102, or any other light source configured to emit the first emission 20. In this configuration, the lighting controller of the vehicle is configured to control a brightness and/or intensity of the light source 16 to alert an operator of the vehicle 10 to a vehicle warning condition.

The intensity and or perceived brightness of the light 16 source may be controlled by the lighting controller by incorporating at least one circuit configured to control the brightness and/or intensity of the light source 16. The lighting controller may adjust the brightness and/or intensity of the light source 16 in response to the signal from the ambient light sensor 106. The lighting controller may control the brightness and/or intensity of the first emission 20 by increasing or decreasing a duty cycle of a pulse width modulated control signal communicated to the light source 16. The control signal may be communicated to the light source 16 in response to a vehicle warning condition and a level of ambient light detected by the ambient light sensor 106. By incorporating the ambient light sensor 106, the indicator apparatus 12 may ensure that the warning indicator is clearly visible to an operator of the vehicle 10 during various ambient light conditions.

Figure 6:
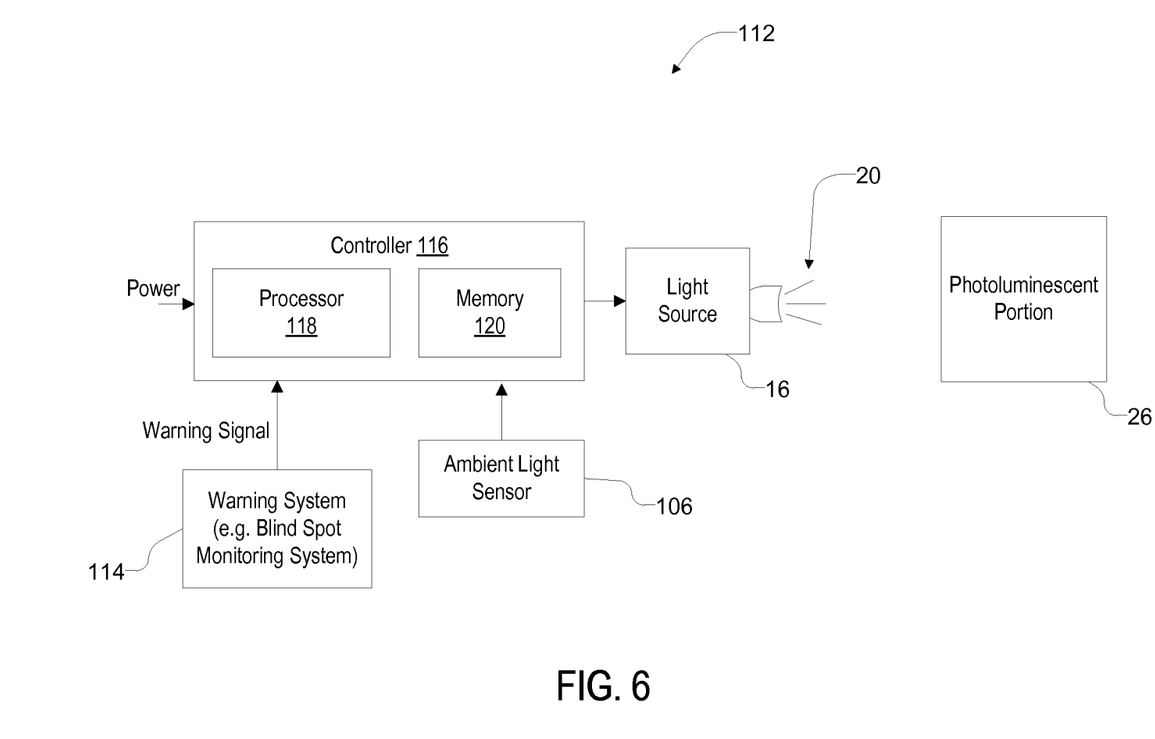
FIG. 6 is a block diagram of a vehicle notification system in accordance with the disclosure.

Referring now to FIG. 6, a block diagram of a vehicle notification system 112 demonstrating the indicator apparatus 12 and a warning system 114. The warning system may comprise any vehicle system configured to alert an operator or passenger of the vehicle 10 of a warning condition. In an exemplary implementation, the warning system 114 may comprise a blind spot monitoring system. The vehicle notification system 112 may receive at least one warning signal in the form of an analog or digital signal from the warning system 114 to determine that a warning condition exists.

The vehicle notification system 112 may comprise a controller 116 comprising one or more circuits configured to receive the warning signal from the warning system 114. The controller may comprise at least one processor 118 and a memory 120 operable to complete at least one logic operation in response to receiving the warning signal. In response to receiving the warning signal, the controller 116 is operable to activate the light source 16 to output the first emission 20. In response to receiving the first emission 20 the photoluminescent portion 26 may become excited and output the second emission 30.

The controller 116 is further in communication with the ambient light sensor 106. The ambient light sensor may be operable to communicate a light condition, for example a level brightness or intensity of the ambient light proximate the vehicle 10. In response to the level of the ambient light, the controller 116 may be configured to adjust an output intensity output from the light source 16. The intensity of the light output from the light source may be adjust by controlling a duty cycle, current, or voltage supplied to the light source.

Each of the configurations of the indicator apparatus 12 may provide for the illumination of at least a portion of the A-pillar 22 via a light source located in a remote location relative to the A-pillar. The various implementations provide various benefits including providing the warning indicator 28 that may be configured to emit the second emission 30 from any portion a forward vehicle pillar without requiring a light source and corresponding wiring in the forward vehicle pillar. This may be particularly beneficial in vehicles having limited space for an indicator apparatus in a forward vehicle pillar or A-pillar. The disclosure provides various novel approaches to incorporate the warning indicator in a visibly obvious location within a field of view of a vehicle operator to provide a notification of a warning condition.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle notification apparatus comprising:
   a photoluminescent portion disposed on a forward vehicle pillar adjacent a windshield; and
   a light source separately disposed away from the photoluminescent portion and located proximate the forward vehicle pillar, the light source configured to emit light at a first wavelength directed toward the photoluminescent portion, wherein the photoluminescent portion is configured to convert the first wavelength to at least a second wavelength longer than the first wavelength to illuminate a surface of the forward vehicle pillar.

2. The vehicle notification apparatus according to claim 1, wherein the light source is configured to selectively illuminate the photoluminescent portion in response to a vehicle warning condition.

3. The vehicle notification apparatus according to claim 1, wherein the light source is configured to direct the light at the first wavelength through at least a portion of a passenger compartment to illuminate the photoluminescent portion.

4. The vehicle notification apparatus according to claim 1, wherein the first wavelength is approximately less than 500 nm such that the first wavelength of the light is not significantly visible.

5. The vehicle notification apparatus according to claim 1, wherein the light source is disposed in one of a window ledge, a door frame, and a headliner of the vehicle.

6. The vehicle notification apparatus according to claim 1, wherein the photoluminescent portion is disposed along a seal portion of a front window trim.

7. The vehicle notification apparatus according to claim 6, wherein the photoluminescent portion extends from a significantly forward bottom portion of the window trim upward and is significantly co-extensive with an upper extent of the windshield to maximize a notification to the operator.

8. The vehicle notification apparatus according to claim 1, wherein the photoluminescent portion comprises a photoluminescent structure disposed in an interior material of the forward vehicle pillar.

9. The vehicle notification apparatus according to claim 1, wherein the forward pillar corresponds to an A-pillar of a vehicle.

10. A vehicle notification system comprising:
at least one photoluminescent portion located on a forward vehicle pillar adjacent a windshield; and
at least one light source separately disposed away from the photoluminescent portion and in communication with a light controller and a vehicle warning system, wherein the light source is configured to emit light at a first wavelength toward the photoluminescent portion to illuminate the photoluminescent portion in at least a second wavelength in response to a signal received from the vehicle warning system.

11. The vehicle notification system according to claim 10, further comprising:
an ambient light sensor in communication with the light source controller.

12. The vehicle notification system according to claim 11, wherein the light controller is configured to vary an intensity of the light at the first wavelength from the light source in response to an ambient light level detected by the ambient light detector.

13. The vehicle notification system according to claim 10, wherein the at least one photoluminescent portion comprises a first photoluminescent portion disposed on a driver side A-pillar and a second photoluminescent portion disposed on a passenger side A-pillar.

14. The vehicle notification system according to claim 13, wherein the at least one light source comprises a first light source configured to illuminate the driver side photoluminescent portion and a second light source configured to illuminate the passenger side light source.

15. The vehicle notification system according to claim 14, wherein the light controller is configured to illuminate the first light source and the second light source in response to a blind spot warning detected by the vehicle warning system.

16. The vehicle notification system according to claim 15, wherein the light controller is configured to illuminate the first photoluminescent portion in response to a target vehicle detected by the vehicle warning system in a driver side region.

17. The vehicle notification system according to claim 16, wherein the light controller is configured to illuminate the second photoluminescent portion in response to a target vehicle detected by the warning system in the passenger side region.

18. A vehicle notification system comprising:
a photoluminescent portion disposed proximate an A-pillar; and
a light source separately disposes away from the photoluminescent portion and located proximate the A-pillar and configured to emit light at a first wavelength directed toward the photoluminescent portion, wherein the photoluminescent portion is configured to convert the first wavelength to at least a second wavelength longer than the first wavelength to illuminate a surface of the forward vehicle pillar.

19. The notification system according to claim 18, further comprising:
a light pipe extending from the light source to the photoluminescent portion, the light pipe configured to communicate the light at the first wavelength to substantially all of the photoluminescent portion.

20. The notification system according to claim 19, wherein the light pipe is disposed behind the photoluminescent portion relative to a passenger compartment in a backlit configuration.

* * * * *

UNITED STATES PATENT AND TRADEMARK OFFICE
CERTIFICATE OF CORRECTION

| | | |
|---|---|---|
| PATENT NO. | : 9,527,438 B2 | Page 1 of 1 |
| APPLICATION NO. | : 14/322506 | |
| DATED | : December 27, 2016 | |
| INVENTOR(S) | : Stuart C. Salter et al. | |

It is certified that error appears in the above-identified patent and that said Letters Patent is hereby corrected as shown below:

In the Claims

Column 12, Claim 18, Line 27:
"disposes" should be --disposed--.

Signed and Sealed this
Ninth Day of May, 2017

Michelle K. Lee
*Director of the United States Patent and Trademark Office*